United States Patent
Zhou et al.

(10) Patent No.: US 11,035,357 B2
(45) Date of Patent: *Jun. 15, 2021

(54) SYSTEM AND METHOD FOR CONTROLLING A SYSTEM THAT INCLUDES VARIABLE SPEED COMPRESSOR

(71) Applicant: TRANE INTERNATIONAL INC., Davidson, NC (US)

(72) Inventors: John Zhou, Onalaska, WI (US); Roger J. Voorhis, Clarksville, TN (US); Thomas J. Clanin, La Crescent, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 345 days.

This patent is subject to a terminal disclaimer.

(21) Appl. No.: 15/722,241

(22) Filed: Oct. 2, 2017

(65) Prior Publication Data
US 2018/0087498 A1    Mar. 29, 2018

Related U.S. Application Data

(63) Continuation of application No. 14/654,789, filed as application No. PCT/US2013/077203 on Dec. 20, 2013, now Pat. No. 9,777,724.
(Continued)

(51) Int. Cl.
*F04B 49/20*    (2006.01)
*F04B 49/06*    (2006.01)
(Continued)

(52) U.S. Cl.
CPC ............ *F04B 49/20* (2013.01); *F04B 49/065* (2013.01); *F24F 11/30* (2018.01); *F24F 11/62* (2018.01);
(Continued)

(58) Field of Classification Search
CPC ........ F24F 11/30; F24F 11/62; F24F 2110/00; F24F 2140/50; F24F 11/70; F24F 11/64;
(Continued)

(56) References Cited

U.S. PATENT DOCUMENTS 3,742,370 A    6/1973    Hansen
4,257,238 A *  3/1981    Kountz ................ F24F 11/0009
                                                          62/176.3
(Continued)

FOREIGN PATENT DOCUMENTS

CN    101526260    9/2009
CN    101634472    1/2010
(Continued)

OTHER PUBLICATIONS

Masutani et al., Air Conditioner and Method for Controlling the Same, Jun. 10, 2010, JP2010127572A, Whole Document (Year: 2010).*

(Continued)

*Primary Examiner* — Larry L Furdge
(74) *Attorney, Agent, or Firm* — Hamre, Schumann, Mueller & Larson, P.C.

(57) ABSTRACT

Method and system for controlling a compressor and a supply fan in a heating, ventilating and air conditioning (HVAC) system are disclosed. The system includes a compressor having a startup state and a running state, a supply fan, and a controller configured to control the compressor and the supply fan in the HVAC system. The compressor and the supply fan are controlled based on a dehumidification map and/or an efficiency map. The system also includes a cooling coil configured to receive a fluid in heat exchange relationship with refrigerant from an evaporator to cool air. The supply fan is configured to deliver the cooled air from the cooling coil to a conditioned space as supply air.

8 Claims, 6 Drawing Sheets

Related U.S. Application Data

(60) Provisional application No. 61/745,032, filed on Dec. 21, 2012.

(51) Int. Cl.

| | | |
|---|---|---|
| *F24F 11/30* | (2018.01) | |
| *F24F 11/62* | (2018.01) | |
| *F24F 11/77* | (2018.01) | |
| *F24F 110/00* | (2018.01) | |
| *F24F 140/50* | (2018.01) | |
| *F24F 11/65* | (2018.01) | |

(52) U.S. Cl.
CPC .............. *F24F 11/77* (2018.01); *F24F 11/65* (2018.01); *F24F 2110/00* (2018.01); *F24F 2140/50* (2018.01); *Y02B 30/70* (2013.01)

(58) Field of Classification Search
CPC . F24F 11/77; F24F 11/65; Y02B 30/70; F04B 49/065; F04B 49/20
See application file for complete search history.

(56) References Cited

U.S. PATENT DOCUMENTS

| | | | |
|---|---|---|---|
| 4,697,430 A * | 10/1987 | Toyoda | G05D 23/1917 236/91 C |
| 4,796,436 A | 1/1989 | Voorhis et al. | |
| 5,303,561 A | 4/1994 | Bahel et al. | |
| 5,518,373 A | 5/1996 | Takagi et al. | |
| 5,690,093 A | 11/1997 | Schrank et al. | |
| 5,779,450 A | 7/1998 | Fujiwara et al. | |
| 6,017,192 A | 1/2000 | Clack et al. | |
| 6,079,219 A | 6/2000 | Katsuki | |
| 6,148,634 A * | 11/2000 | Sherwood | C09K 5/041 62/434 |
| 6,757,592 B1 | 6/2004 | Henderson et al. | |
| 7,191,608 B2 | 3/2007 | Yamasaki et al. | |
| 7,640,761 B2 | 1/2010 | Garrett et al. | |
| 9,777,724 B2 * | 10/2017 | Zhou | F24F 11/30 |
| 2002/0078700 A1 | 6/2002 | Kelm et al. | |
| 2009/0297362 A1 | 12/2009 | Gallwey et al. | |
| 2012/0153725 A1 | 6/2012 | Grohman | |

FOREIGN PATENT DOCUMENTS

| | | | |
|---|---|---|---|
| CN | 102016454 | | 4/2011 |
| CN | 102348945 | | 2/2012 |
| CN | 102483251 | | 5/2012 |
| JP | S5762348 A | * | 4/1982 |
| JP | H02267448 A | * | 11/1990 |
| JP | 06-087323 | | 3/1994 |
| JP | 2004286294 A | * | 10/2004 |
| JP | 2006-258388 | | 9/2006 |
| JP | 4439419 | | 3/2010 |
| JP | 2010127572 A | * | 6/2010 |

OTHER PUBLICATIONS

Fushimi et al., Refrigerating Machine, Oct. 14, 2004, JP2004286294A, Whole Document (Year: 2004).*

Nakasumi et al, Air Conditioner and Its Operation Controller, Nov. 1, 1990, JPH02267448A, Whole Document (Year: 1990).*

Okuda et al., Air Conditioner, Apr. 15, 1982, JPS5762348A, Whole Document (Year: 1982).*

International Search Report and Written Opinion of International Application No. PCT/US2013/077203, dated Mar. 19, 2014, 11 pgs.

* cited by examiner

SYSTEM AND METHOD FOR CONTROLLING A SYSTEM THAT INCLUDES VARIABLE SPEED COMPRESSOR

The embodiments disclosed herein relate generally to a system and method for controlling a system that includes at least one variable speed compressor.

BACKGROUND

Generally, certain factors such as a minimum operating speed are required for prolonging the life of a variable speed compressor. Such requirements can affect energy efficiencies. Improvements in control of systems that include a variable speed compressor are desirable.

SUMMARY

The embodiments described herein are directed to a system and method for controlling a system that includes for example at least one variable speed compressor. The method can provide improved accuracy in the control of a system, for example, a heating, ventilating, and air condition (HVAC) system that includes at least one variable speed compressor, and can reduce a compressor cycling frequency of the compressor when a required capacity is below a minimum capacity of the compressor.

Generally, the improved accuracy and reduction in compressor cycling frequency are achieved by simultaneously controlling the variable speed compressor and a supply fan that are included in the system. The system and method described herein can advantageously lead to improved energy efficiencies. That is, in general, cycling between startup and shutdown can not only help prolong the life of the compressor, but also can improve energy efficiencies. The system and method described herein also can lead to a higher percentage latent capacity for improved space dehumidification so that an additional reheating of the supply air which is typically conducted by traditional air-side products for dehumidification is not required.

In general, a different fan speed and compressor speed combination can provide the same unit or required capacity. The system and method described herein can determine the fan speed from the current compressor speed based on predetermined equations or maps. An energy efficiency equation/map can be setup so that the system will achieve maximum energy efficiency when provided the same unit or required capacity.

In some examples, the dehumidification map can have a lower fan speed than the energy efficiency map does when the same compressor speed is used. In this instance, controlling based on the dehumidification equation/map can remove more moisture and improve space dehumidification. In some instances, the controller can choose to run based on an energy efficiency map when space humidity is not high and to run based on a dehumidification map when space humidity is too high.

In some embodiments, the system includes a variable speed compressor, a condenser, an evaporator, and a supply fan. In some examples, the system can further include a controller that is configured to control the system by executing a control program or algorithm that is stored in a memory of the controller. In some examples, the controller is configured so that the variable speed compressor can operate in four different operational states: a unit off state, a startup state, a running state and a shutdown state.

In the unit off state, the variable speed compressor stays off at the off position so that the speed of the variable speed compressor is at 0 revolutions per second (rps). In some instances, the fan also can be off so that the speed of the fan is at 0 rps.

In the startup state, the speed of the variable speed compressor can ramp up at a constant rate from 0 rps until the speed reaches a startup speed of the compressor. In some instances, the fan can run at a minimum speed.

In the running state, the variable speed compressor is modulated between a minimum speed and a maximum speed. In some instance, the fan also can be modulated between a minimum speed and a maximum speed.

In the shutdown state, the variable speed compressor can ramp down from the minimum speed to 0 rps. The shutdown is complete when 0 rps is reached. In some instances, the fan can run at a minimum speed.

In one embodiment, the algorithm that is executed by the controller includes determining a required capacity and comparing the determined required capacity with a minimum capacity of a variable speed compressor.

If the determined required capacity is greater than the minimum capacity of the variable speed compressor, then the variable speed compressor operates in the running state.

If the determined required capacity is less than the minimum capacity of the variable speed compressor, then the variable speed compressor will cycle between the four different operating states based on the determined required capacity.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments described herein are directed to a system and method for providing control in a system that includes a variable speed compressor. The system can be any system that utilizes a variable speed compressor, including water source heat pumps, unitary equipment, air handlers and terminal units.

Figure 1:
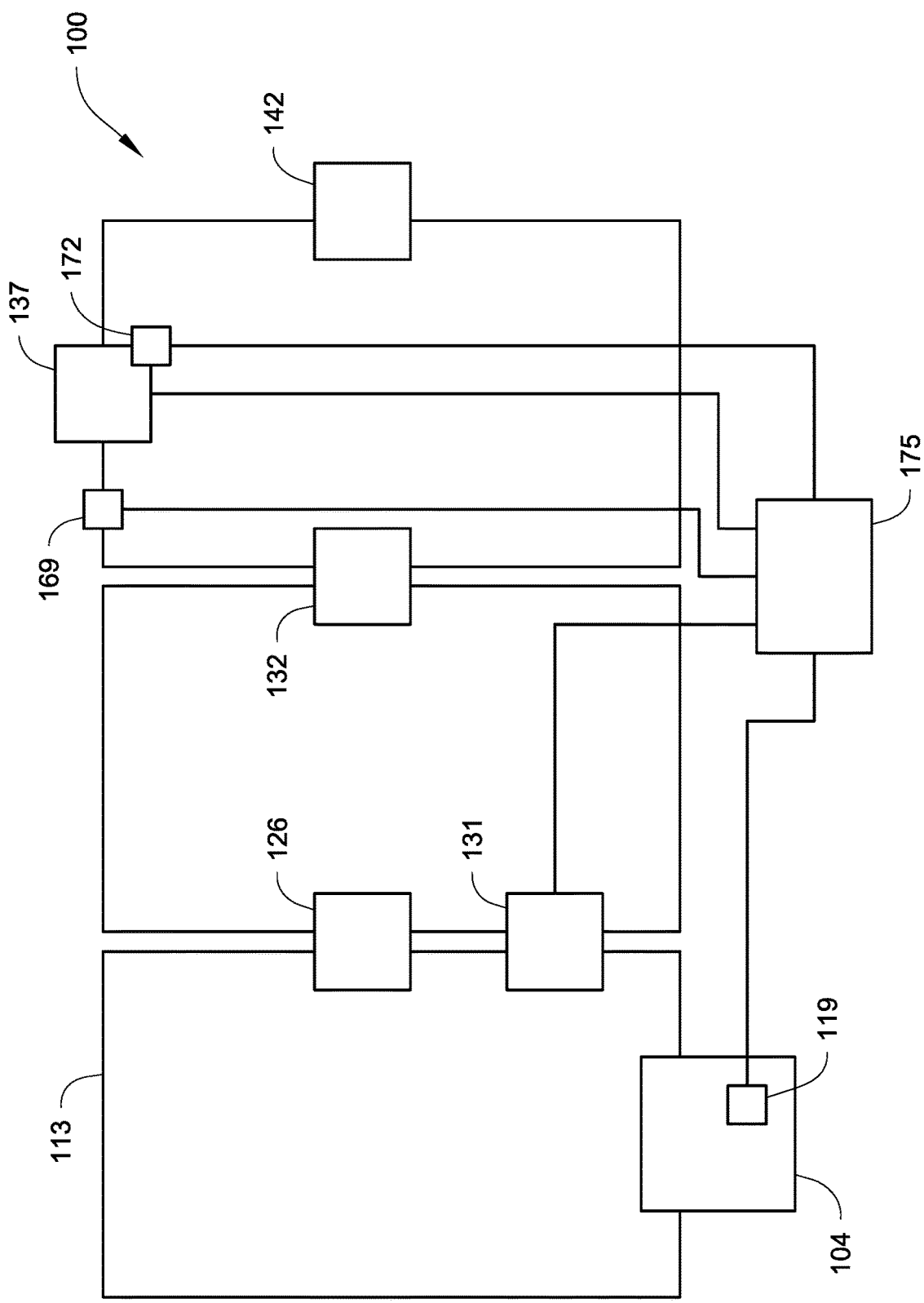
FIG. 1 is a schematic illustration of a system for controlling a variable speed compressor and a supply fan, according to one embodiment.

FIG. 1 provides a schematic illustration of one embodiment of the disclosed system (see system 100 in FIG. 1). The system 100 includes a conditioned space 104 and a ductwork 113 that is in fluid communication with the conditioned space 104. The term "conditioned space" herein means a single space or a group of spaces, where the single space or the group of spaces can be defined as a zone or zones. The conditioned space 104 can include a thermostat 119 that measures a dry-bulb temperature of the conditioned space 104. The term "dry-bulb temperature" herein means a temperature of air measured by the thermostat 119 that is freely exposed to the air but shielded from radiation and moisture.

The ductwork 113 can include a cooling coil 126 and a supply fan 131. The ductwork 113 can include other components that are typically included in a HVAC system, including a relief fan (not shown). The ductwork 113 and the conditioned space 104 can be configured so that needed airflow can flow from the ductwork 113 into the conditioned space 104, back into the ductwork 113 and then out of the ductwork 113 as generally known in the art.

Generally, air flows past the cooling coil 126 so as to be cooled. The cooled air then is delivered by the supply fan 131 into the conditioned space 104 as supply air. The supply fan 131 also can be used to draw air out of the conditioned space 104 as return air. Some outdoor air for ventilation can be mixed with the recirculated portion of the return air. The remaining return air, that which has been replaced by outdoor air, can be then exhausted as exhaust air by a relief fan.

In some examples, the cooling coil 126 can be in fluid communication with a condenser 142 and a compressor 137. In FIG. 1, the system 100 is illustrated as having one compressor, but it is to be realized that more than one compressor can be used. In the instance where more than one compressor is used, the compressors can operate, for example, parallel to one another.

In one example, the compressor 137 is a variable speed compressor. The term "variable speed compressor" means a compressor whose speed can be controlled, for example, by a controller, as generally understood in the art. The variable speed compressor 137 can include components that are generally known in the art, including a variable speed drive and a motor. The speed of the compressor 137 is generally controlled by controlling the speed of the motor that is driven by the variable speed drive. The variable speed compressor 137 can be any compressor type that is suitable for use in a HVAC system, and can include, but is not limited to reciprocating, scroll, rotary, screw, centrifugal, etc. It is to be realized that some deviation or enhancements may be required depending on the type of compressor used, e.g., for a screw or centrifugal compressor.

The variable speed compressor 137 generally functions to compress refrigerant gas and feed the resulting high-pressure and high-temperature refrigerant gas to the condenser 142. As is generally understood in the art, a capacity of the variable speed compressor 137 is based on the operating speed of the variable speed compressor 137. That is, the capacity of the variable speed compressor 137 will generally increase as compressor speed increases when other variables in the system stay the same. In the description that follows, a variable speed compressor will be described. However, it is to be realized that the concepts herein can apply to any suitable modulating capacity compressor. Note that a variable speed compressor is understood to be an example of a modulating capacity compressor. The other variables may include condenser fan speed, condenser ambient conditions and evaporator entering air conditions.

Generally, the variable speed compressor 137 has a minimum capacity. The term "minimum capacity of the variable speed compressor 137" means the lowest operating speed or capacity of the variable speed compressor 137 necessary to prevent damage to the variable speed compressor 137. That is, in general, as the load of a variable speed compressor decreases, the compressor becomes less efficient, which can lead to increased internal compressor temperatures. This can in turn lead to overheating of the rotor temperature and the radial expansion or radial growth of the rotors. This radial growth can result in a radial rub with the compressor housing, subsequently causing a failure. Also, damage can result from a lack of compressor lubrication at lower operating speeds. The minimum capacity of the variable speed compressor 137 is the lowest operating speed or capacity of the variable speed compressor 137 necessary to prevent such failure of the variable speed compressor 137. It is to be appreciated that the minimum capacity of the variable speed compressor 137 can be determined and/or set by a user.

In some instances, the minimum capacity of the variable speed compressor 137 is dependent on factors such as the type of variable speed compressor 137 used. In some examples, the minimum capacity of the variable speed compressor 137 is predetermined, e.g., by the manufacturer of the variable speed compressor 137. In some other examples, the minimum capacity of the variable speed compressor 137 is set by a user. In some other examples, the minimum capacity of the variable speed compressor 137 can be calculated in a manner that is generally known in the art, e.g., based on readings from a temperature sensor 169 of the fluid that is discharged from the compressor 137 and/or a temperature sensor 172 of the compressor 137.

The cooling coil 126, the condenser 142 and the compressor 137 can utilize a refrigeration cycle that is generally known in the art. In some instances of the refrigeration cycle, the variable speed compressor 137 can feed high-pressure and high-temperature refrigerant gas to the condenser 142. The refrigerant vapor that is delivered to the condenser 142 then can enter into a heat exchange relationship with a fluid, for example, air. The condensed liquid refrigerant from the condenser 142 then can flow through an expansion device (not shown) to an evaporator 132. A secondary liquid, e.g., water, that has flowed into the evaporator 132 then can enter into a heat exchange relationship with the low pressure/low temperature liquid refrigerant to chill the temperature of the secondary liquid. The chilled secondary liquid can then run through the cooling coil 126, and the refrigerant liquid in the evaporator 132 can undergo a phase change to a refrigerant vapor as a result of the heat exchange relationship with the secondary liquid. The refrigerant vapor then can return to the variable speed compressor 137 to complete the refrigeration cycle.

The system 100 further can include a controller 175. The controller 175 generally can include a processor, a memory, a clock and an input/output (I/O) interface and can be configured to receive data as input from various components within the system 100, and send command signals as output to various components within the system 100.

In some examples, during operation, the controller 175 can receive information, for instance, from the variable speed compressor 137, the supply fan 131, the thermostat 119, the temperature sensor 169, and/or the temperature sensor 172 through the I/O interface, process the received information using the processor based on an algorithm stored in the memory, and then send command signals, for instance, to the components involved in the refrigeration cycle including the compressor 137 and/or the supply fan 131. For example, the controller 175 can receive information regarding the dry-bulb temperature from the thermostat 119 and the current operating speed of the variable speed compressor 137, process the data, and then based on the data, send a command signal to the variable speed compressor 137 so as to control the speed of the compressor 137. It is to be realized that the controller 175 can be configured to receive information and send command signals to other components that are generally known to be included in a system that utilizes a variable speed compressor.

Details of the various algorithms that can be stored in the memory will now be provided below.

Figure 2A:
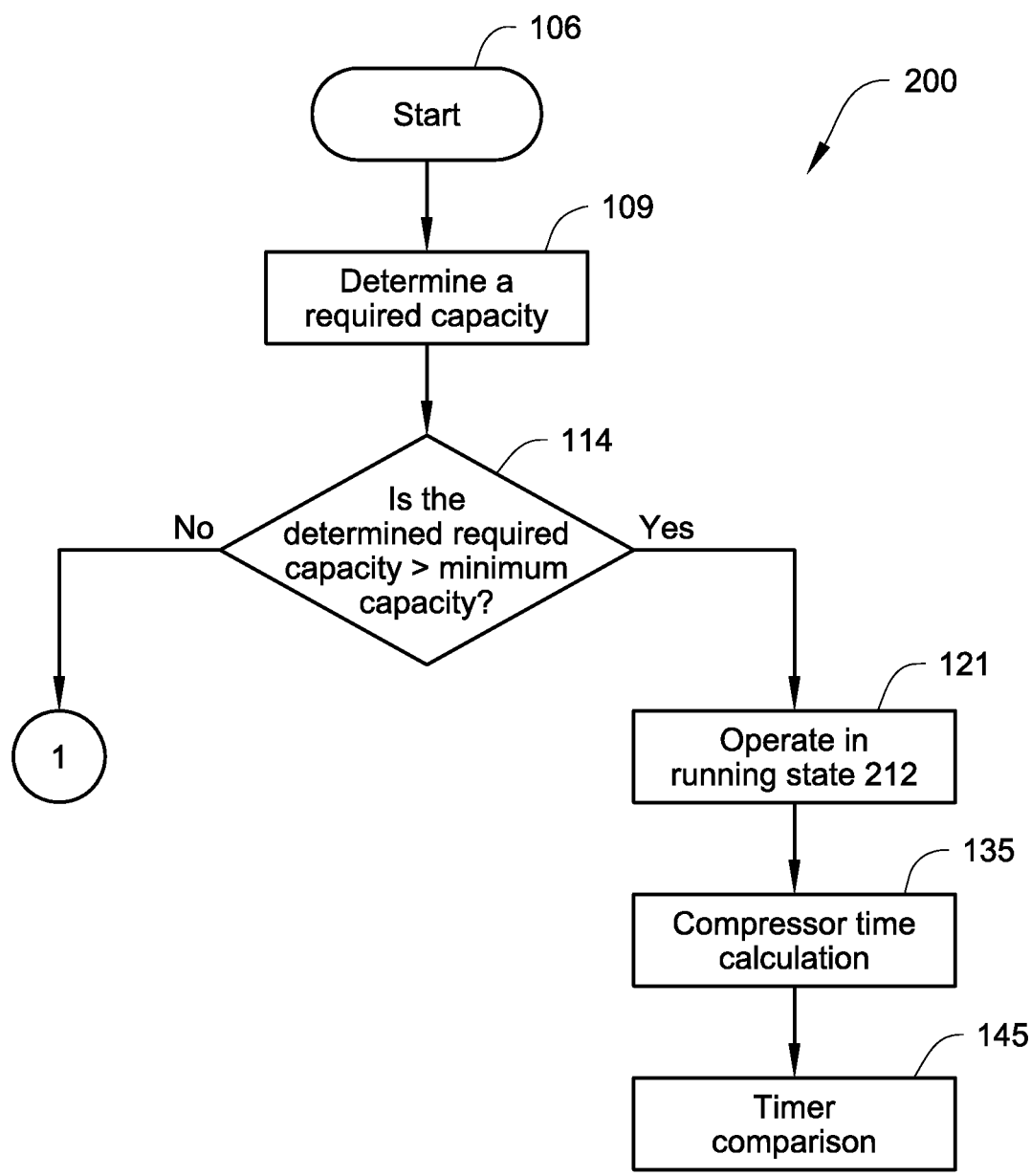
FIGS. 2A and 2B are flow charts of the overall processes involved in controlling the variable speed compressor, according to one embodiment.
Figure 2B:
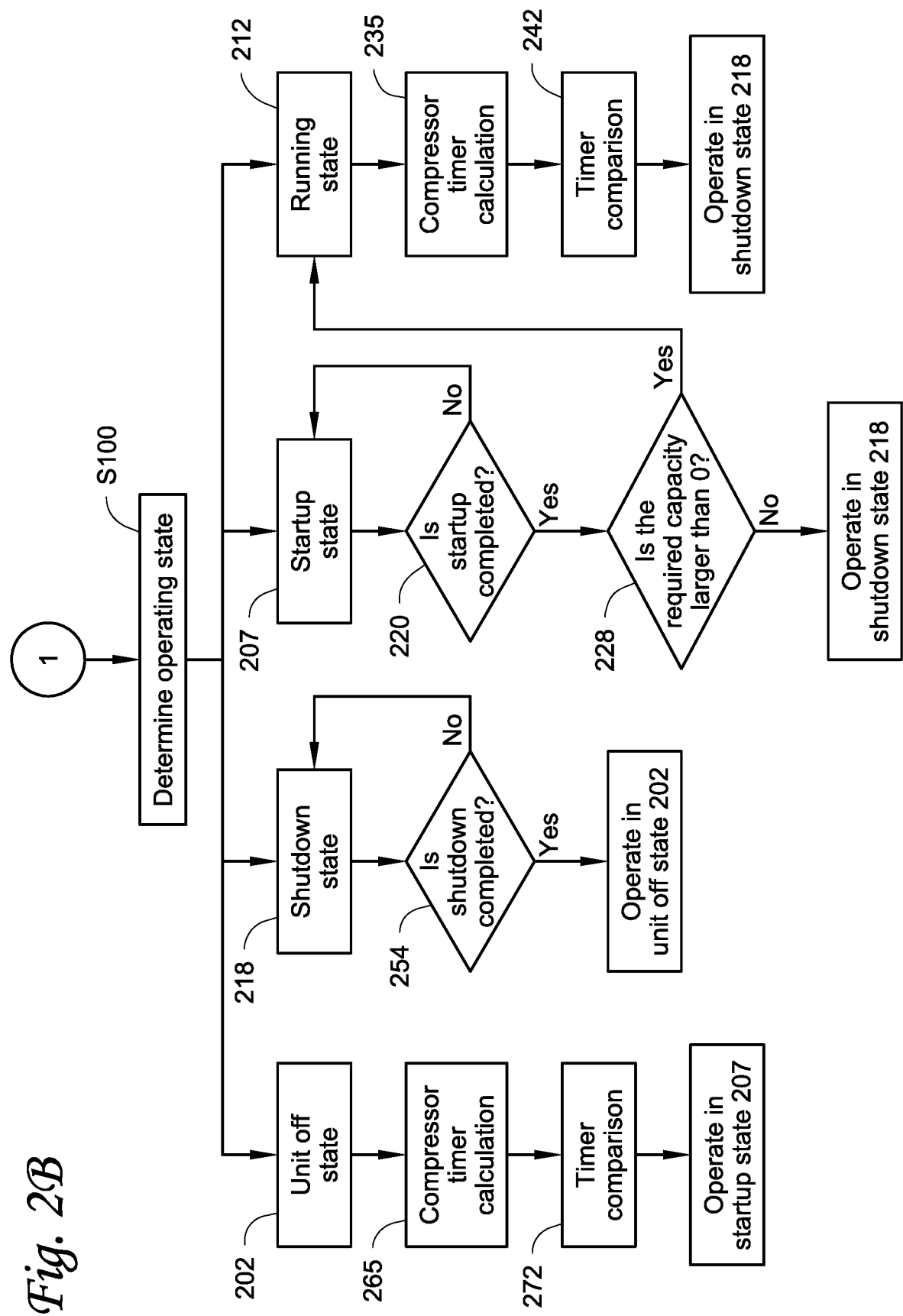

Generally, the controller 175 can be configured to implement the disclosed method of controlling the system 100 as illustrated in FIGS. 2A and 2B. In general, the processes described in FIGS. 2A and 2B are executed by the processor executing program instructions (algorithms) stored in the memory of the controller 175. The process can be initiated at any time during the four different operating states of the variable speed compressor 137. In some examples, the process can be initiated manually by a user, or initiated automatically, for example, by a preprogrammed instruction stored inside the memory.

With reference to FIG. 2A, in one embodiment, the disclosed method or algorithm 200 initiates at step 106 and proceeds to step 109 where a determination is made as to a required capacity of the conditioned space 104. The term "required capacity" means a capacity or speed of the variable speed compressor 137 that is necessary to achieve a predetermined temperature and/or a predetermined relative humidity.

The determination of the required capacity can involve the use of certain parameters and calculations that are generally known in the art. For instance, the determination of the required capacity can be based on a prediction algorithm that involves calculations using a current reading of a dry-bulb temperature of the thermostat 119 and a predetermined temperature of the conditioned space 104. The predetermined temperature may be a temperature of the conditioned space that is desired by a user. The predetermined temperature may be manually set by a user, e.g., as input to be processed by the controller 175.

In one example, a PI controller can be used to determine the required capacity. In this instance, when the space temperature is above a set point, the PI controller will increase the capacity value, and when the space temperature is below the set point, the PI controller will decrease the capacity value. The adjustment will continue until the temperature reaches set point. The final capacity value is the "required capacity". In one example, passive dehumidification is employed. In this instance, when relative humidity is high, a dehumidification map is used to coordinate the fan and the compressor, which will remove more moisture from conditioned air. The required capacity is calculated in the same manner as described above.

After step 109, a determination is made as to whether the required capacity is larger than a minimum capacity of the variable speed compressor 137. In some examples, the minimum capacity of the variable speed compressor 137 can be predetermined. In some other examples, the minimum capacity of the variable speed compressor 137 can be set by a user, e.g., as an input to be processed by the controller 175. In some other examples, the minimum capacity of the variable speed compressor 137 can be calculated by the controller 175 in a manner that is generally known in the art, e.g., based on readings from a temperature sensor 169 of the fluid that is discharged from the compressor 137 and/or a temperature sensor 172 of the compressor 137.

If the required capacity is the same as the minimum capacity, then the variable speed compressor 137 will remain at the minimum speed.

Figure 3:
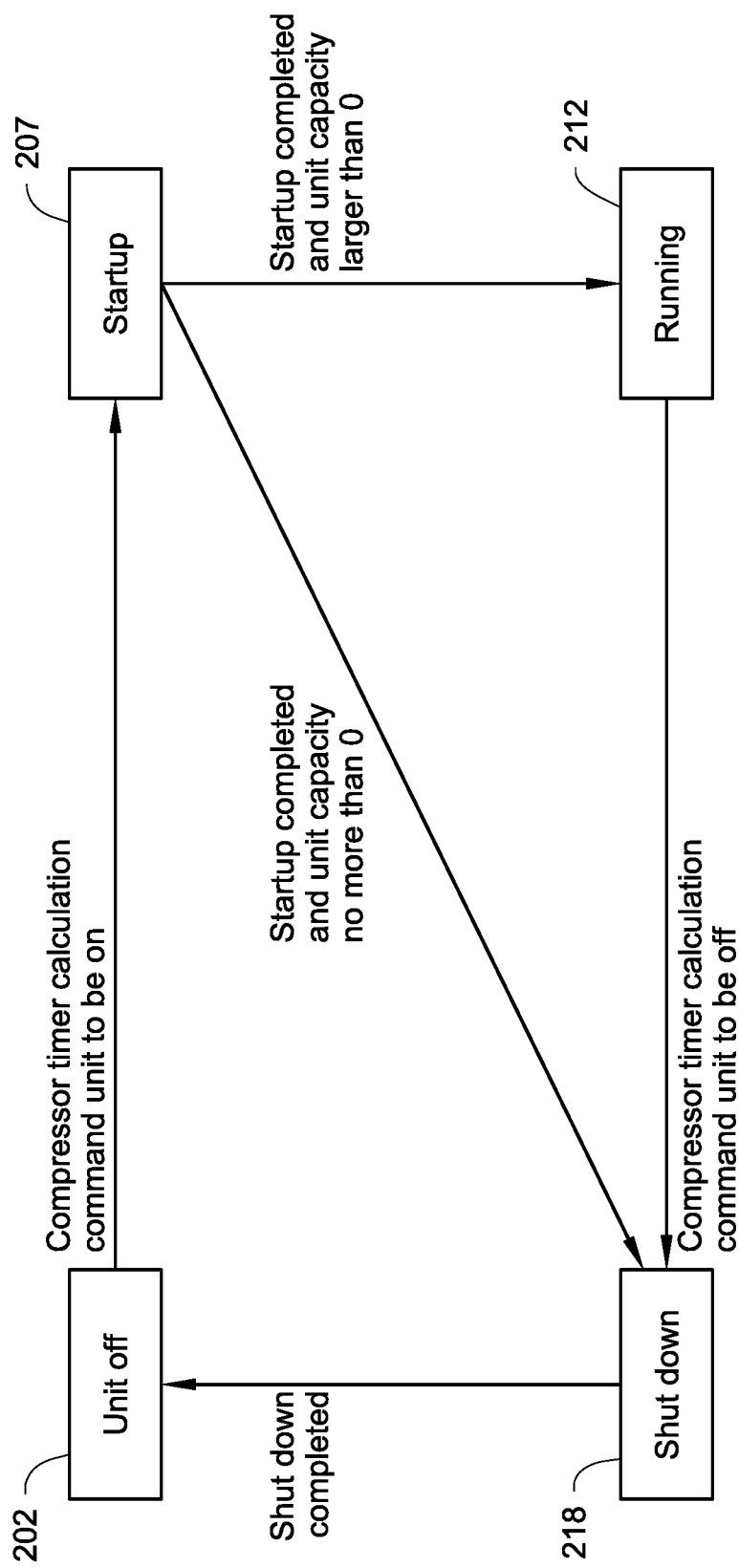
FIG. 3 shows a schematic representation of the cycling process, according to one embodiment.

If the required capacity is less than the minimum capacity, then the algorithm proceeds to a cycling process ① (further described/illustrated in FIG. 3). In some examples, conducting the cycling process ① based on the comparison between the determined required capacity and the minimum capacity can lead to improvement in space comfort control accuracy and reduction of compressor cycling frequency as compared to those of dead band based cycling by anticipating the load requirement and its dynamic changes. One example of dead band based cycling is when the space temperature is 1° F. above the set point, the compressor is turned on, and when the space temperature is 1° F. below the set point, the compressor is turned off.

In one example, the load requirement and its dynamic changes is anticipated by the PI controller, for instance, using the current temperature and the previous temperature to calculate the required capacity, and accordingly, taking the change in speed into consideration to predict what may happen in the future.

An overview of the cycling process ① is illustrated in FIG. 3. Generally, the cycling process ① involves cycling between four different operational states: operating in a unit off state 202, operating in a startup state 207, operating in a running state 212 and operating in a shutdown state 218.

In the unit off state 202, the variable speed compressor 137 stays off at the off position so that the speed of the variable speed compressor 137 is at 0 revolutions per second (rps). In some instances, the supply fan 131 also can be turned off so that the speed of the fan 131 is at 0 rps. In some examples, the supply fan 131 is turned off unless it is on fan off delay. "Fan off delay" means that the fan will not turn off until the compressor is turned off for a predetermined amount of time, e.g., about 30 seconds.

In the startup state 207, the speed of the variable speed compressor 137 can ramp up at a constant rate from 0 rps until the speed reaches a startup speed of the compressor 137. In some examples, the constant rate can be predetermined. In one implementation, the constant rate is an increase of about 2 revolutions per second. It is to be realized that the constant rate can vary depending on the allowable speed defined by the system components and the compressor specification. In other examples, the constant rate can be determined based on the required capacity determined in step 109 at FIG. 2. In some examples, the variable speed compressor 137 will ramp up at a constant rate from 0 rps until a startup speed of 25 rps, which is 25% of the maximum speed of 100 rps, is reached. Note that both the minimum and maximum speed values can vary depending on the allowable speed defined by the system components and the compressor specification. In some examples, after the startup speed is reached, the compressor 137 will operate at the startup speed for a predetermined amount of time. In some implementations, the predetermined amount of time is about 120 seconds.

In some instances in the startup state 207, the supply fan 131 can run at a minimum speed where a variable speed fan is used for the supply fan 131.

In the running state 212, the variable speed compressor 137 is modulated between a minimum speed and a maximum speed. In some examples, the minimum speed is a function of entering water temperature (EWT) of the condenser. In some instances, the fan 131 also can be modulated between a minimum speed and a maximum speed.

In the shutdown state 218, the variable speed compressor 137 can ramp down from the minimum speed to 0 rps. Shutdown is complete when 0 rps is reached. In some instances, the fan can run at a minimum speed.

The algorithm of the cycling process ① is illustrated in FIG. 2B. The cycling process ① initially involves determining the operating state of the variable speed compressor 137 (step S100). The operating state of the compressor 137 can be determined to be in the unit off state 202, startup state 207, running state 212 or shutdown state 218. Note that at power-up, the controller 175 will start from the off state and use the logic in FIG. 2B to determine the next operating states.

If the operating state of the compressor 137 is determined to be in the startup state 207, then a determination is made as to whether startup is completed (step 220).

In some examples, startup is completed when the speed of the variable speed compressor 137 reaches the startup speed of the compressor 137.

If startup is determined to be incomplete, then the algorithm goes back to startup 207. If the startup is determined to be complete, then the algorithm goes to step 228.

In step 228, a determination is made as to whether the required capacity determined in step 109 is greater than 0. If the required capacity is greater than 0, then the algorithm proceeds to operating the compressor 137 in the running state 212. If the required capacity is equal to zero, then the compressor 137 proceeds to operate in the shutdown state 218.

Note that in some examples, the algorithm can involve the step of determining whether the required capacity determined in step 109 is greater than 0 before the step of determining whether startup is completed. In this instance, the outcome would be the same as conducting the steps 220 and 228 in that order as described above. For example, if the required capacity is determined to be 0 at the running state, the algorithm goes to the shutdown state 218. If the required capacity is detected to be 0 at the startup state, then the algorithm goes to the shutdown state 218 as well.

If the operating state of the compressor 137 is determined to be in the running state 212, then the algorithm proceeds to step 235 where a time calculation is made. In one example, the time calculation involves calculating an amount of time the compressor will be turned on. In one instance, the time calculation is based on the required capacity calculated in step 109.

After step 235, a timer comparison is made (step 242). In this step, the time that the compressor will be turned on as determined in step 235 is compared with the current time, and the compressor is turned on for an amount of time based on the comparison.

After the compressor 137 is turned on for the determined amount of time, the compressor 137 then operates in the shutdown state 218.

If the operating state of the compressor 137 is determined to be in the shutdown state 218, the algorithm proceeds to step 254 where a determination is made as to whether shutdown is complete. In one example, shutdown is complete when the speed of the compressor reaches 0 rps. If shutdown is determined not to be complete, then the algorithm returns to the shutdown state 218. If shutdown is determined to be complete, then the compressor 137 proceeds to operate in the unit off state 202.

If the operating state of the compressor 137 is determined to be in the unit off state 202, then the algorithm proceeds to step 265 where a time calculation is made. In one example, the time calculation involves calculating an amount of time the compressor will be turned off. In one instance, the time calculation is based on the required capacity calculated in step 109.

After step 265, a timer comparison is made (step 272). In this step, the time that the compressor will be turned off as determined in step 265 is compared with the current time, and the compressor is turned off for the determined amount of time.

After the compressor 137 is turned off for the determined amount of time, the compressor 137 then proceeds to operate in the startup state 207.

Referring back to step 114 in FIG. 2A, if the required capacity is greater than the minimum capacity, then the algorithm proceeds to step 121, where the compressor 137 operates in the running state 212, and then proceeds to step 135 where a time calculation is made. In one example, the time calculation involves calculating an amount of time the compressor will be turned on. In one instance, the time calculation is based on the required capacity calculated in step 109.

After step 135, a timer comparison is made (step 145). In this step, the time that the compressor will be turned on as determined in step 135 is compared with the current time, and the compressor is turned on for the determined amount of time.

Figure 4:
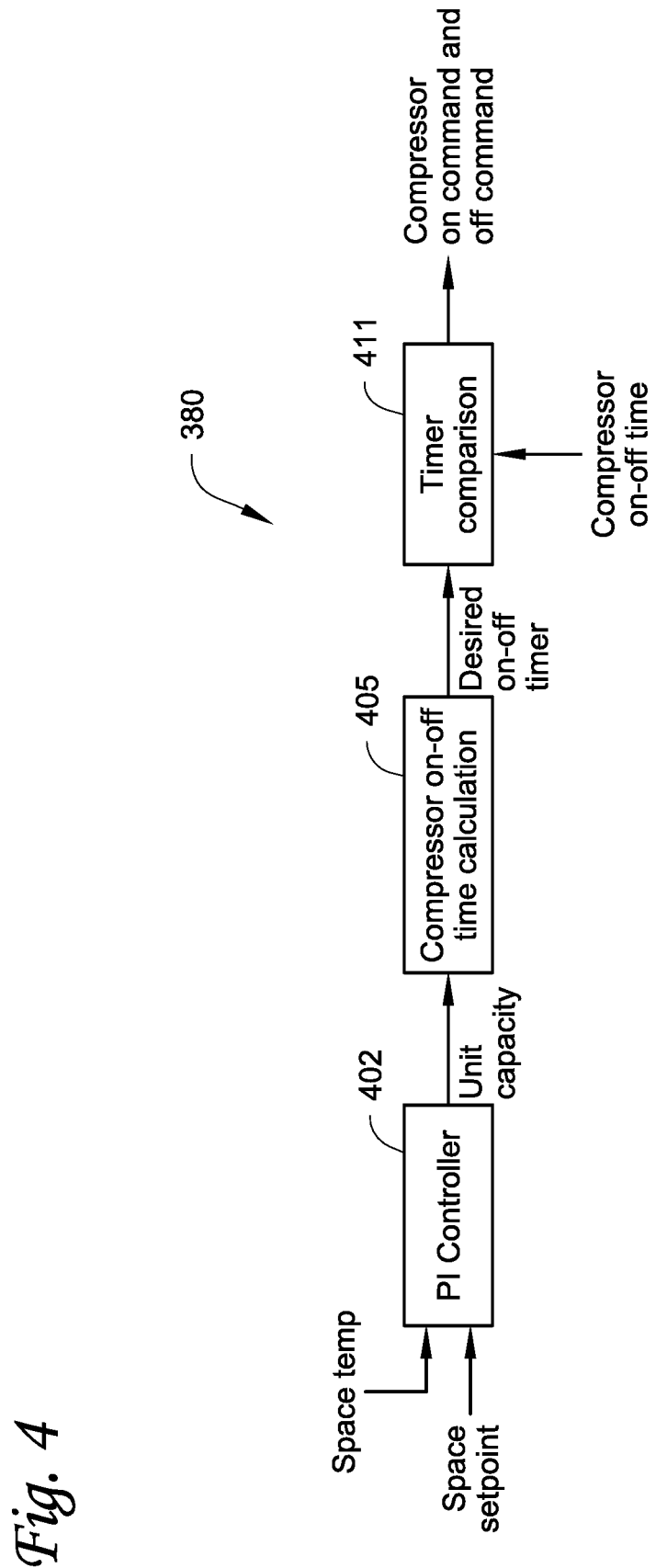
FIG. 4 shows a block diagram of a feedback control system using a PI controller, according to one embodiment.

In some examples, a feedback control system using a PI controller can be used to calculate the required capacity as in step 109, execute the time calculation as in steps 135, 235 and 265, and execute the timer comparison as in steps 145, 242 and 272. A block diagram of a feedback control system 380 using a PI controller 402 is illustrated in FIG. 4.

The PI controller 402 can receive as input a current reading of a dry-bulb temperature of the thermostat 119 and a predetermined temperature of the conditioned space 104. The predetermined temperature may be a temperature of the conditioned space 104 that is desired by a user. The PI controller 402 then can be used to calculate the required capacity, and provide as a controller output if there is a disparity between the current reading of a dry-bulb temperature of the thermostat 119 and the predetermined temperature of the conditioned space 104. The controller output then can be used for calculating the amount of time the compressor needs to be turned on or off (block 405) as in steps 135/235 and 265, respectively, make a timer comparison (block 411) as in steps 145, 242 and 272, and turn the compressor 137 on or off for the determined amount of time.

In one example, the speed of the supply fan 131 can be modulated at the same time as the speed of the compressor 137. In one instance, the supply fan 131 is a variable speed fan. In this instance, the fan speed increases or decreases with the compressor speed following a predetermined map(s). In some examples, the predetermined map(s) is an energy efficiency map(s) and/or a dehumidification map(s). In one example, the "energy efficiency map" and "dehumidification map" are lookup tables where the fan speed is calculated based on the compressor speed. Generally, there are many combinations of fan speed and compressor speed that can provide the same capacity. The energy efficiency map will provide the best overall energy efficiency, while the dehumidification map will provide the best moisture removal performance. In some instances, the fan speed will be lower in the dehumidification map than in the energy efficiency map when the same compressor speed is required.

In some examples, the energy efficiency map is a compressor efficiency map as described in U.S. Pat. No. 5,537,830, which is herein incorporated by reference.

In some examples, the predetermined map(s) coordinate the speeds of the fan 131 and compressor 137. In some instances, the predetermined map(s) are different for the heating mode and the cooling mode. In one example, the heating and cooling mode transition is determined by the controller 175. For example, heating is enabled when the space temperature stays below a set point for an extended period of time, while cooling is enabled when the space temperature stays above a set point for an extended period of time.

In other instances, the predetermined map(s) can change based on operating conditions such as the entering water temperature for a water-source unit. In this instance, the system 100 would further include a sensor (not shown) for the entering water for the water-source unit. In yet some other instances, the predetermined map(s) includes a dehumidification map. In some implementations, the dehumidification map has a lower fan speed to provide a higher percentage of latent capacity for improved space dehumidification. In one example, with the same compressor speed and the same entering air condition, the lower fan speed can result in a lower discharge air temperature and a lower saturate humidity. As such, a humidity ratio of the discharge air can be decreased.

In another instance, the supply fan 131 is a fixed speed fan. In this instance, the supply fan 131 is turned on or off at the same time the speed of the compressor 137 is modulated. In one instance, the fan 131 is turned on or off for a certain amount of time depending on the predetermined map(s) described above. In one example, the fan will be turned on when the compressor is on, and the fan will be turned off after the compressor is turned off for a period of fan off delay.

Figure 5:
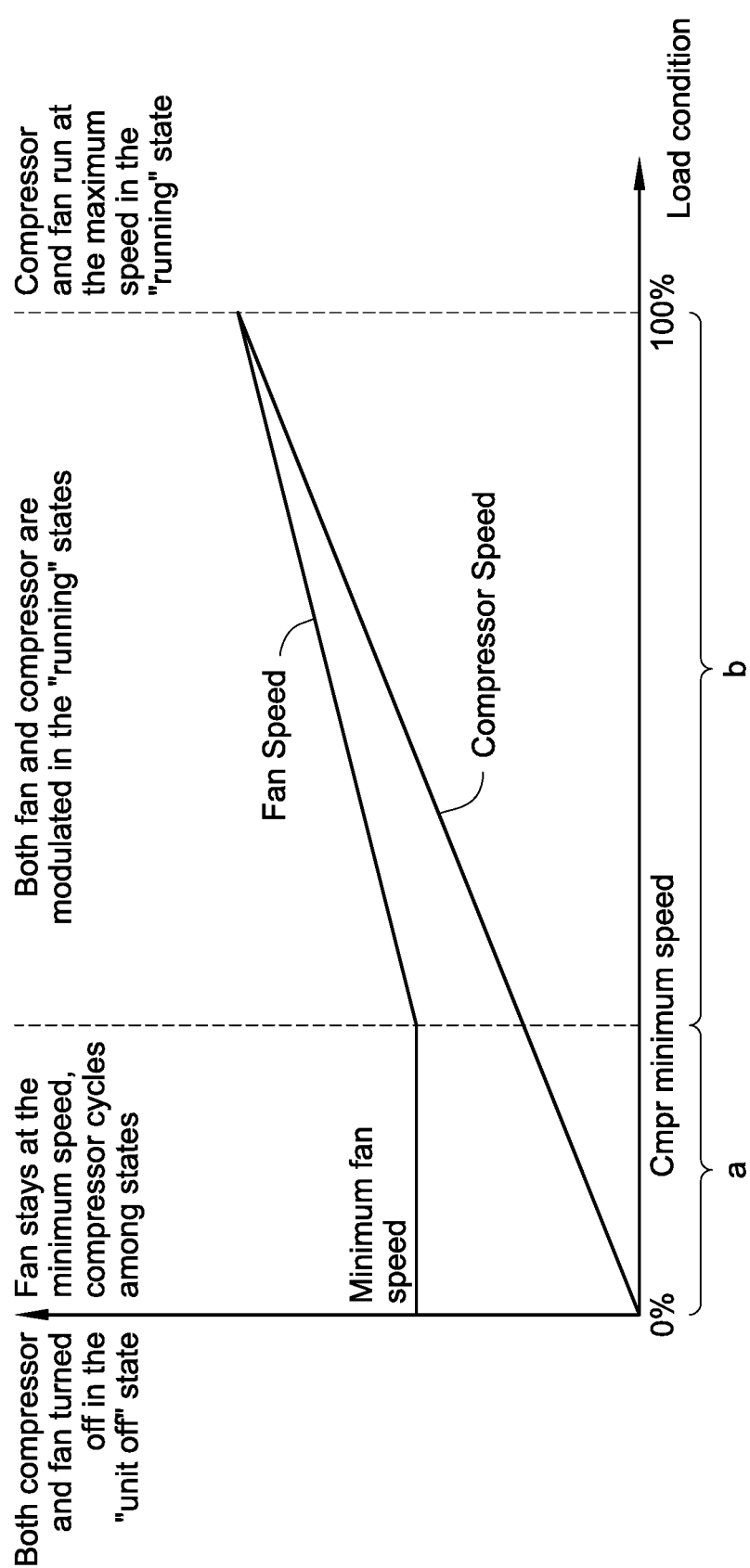
FIG. 5 shows a graph of how the speeds of the supply fan and the compressor are modulated simultaneously, according to one embodiment.

One example of how the speed of the supply fan 131 can be modulated at the same time of the speed of the compressor is illustrated in FIG. 5. FIG. 5 depicts a graph, where the x-axis of the graph represents the required capacity and the y-axis of the graph represents the speeds of the supply fan 131 and the compressor 137. In the graph, region "a" represents the startup state 207 and region "b" represents the running state 212.

In the example shown in FIG. 5, during the startup state 207, the compressor 137 ramps up speed at a constant rate from 0 rps to a minimum speed of the compressor 137. During this time period, the supply fan 131 runs at a certain minimum speed. After the compressor 137 reaches its minimum speed, the compressor 137 enters the running state 212, where the compressor 137 continues to ramp up speed at a constant rate. At the point where the compressor 137 reaches its minimum speed and enters the running state 212, the fan 131 begins to increase in speed together with the speed of the compressor 137. The speeds of the fan 131 and compressor 137 increase together at a constant rate until a maximum speed for the fan 131 and a maximum speed for the compressor 137 are reached.

Aspects

Any of aspects 1-8 can be combined with any of aspects 9-14. Any of aspects 1-8 can be combined with aspect 15. Any of aspects 1-8 can be combined with aspect 16.

Aspect 1. A system, comprising:
 a compressor having the following operational states: a unit off state, a startup state, and a running state, and a controller that is configured to
 (a) determine a required capacity of a conditioned space;
 (b) compare the required capacity determined in (a) with a minimum capacity of the compressor,
  wherein if the required capacity determined in (a) is greater than the minimum capacity of the compressor, then
   (c1) operate the compressor in the running state; and
  wherein if the required capacity determined (a) is less than the minimum capacity,
   (c2) cycle between each of the operational states based on the required capacity determined in (a).

Aspect 2. The system of any of aspects 1 and 3-8, further comprising a supply fan, wherein the compressor is a variable speed compressor, and the supply fan and the variable speed compressor are controlled simultaneously.

Aspect 3. The system of any of aspects 1-2 and 4-8, wherein operational state of the compressor further comprises a shutdown state, wherein in the unit off state, the compressor stays off at the off position so that the speed of the compressor is at 0 revolutions per second (rps), wherein in the startup state, the speed of the compressor ramps up at a constant rate from 0 rps until the speed reaches a startup speed of the compressor, wherein in the running state, the compressor is modulated between a minimum speed and a maximum speed, and wherein in the shutdown state, the compressor ramps down from the minimum speed to 0 rps.

Aspect 4. The system of any of aspects 1-3 and 5-8, wherein in the unit off state, the supply fan is off so that the speed of the supply fan is at 0 rps, wherein in the startup state, the supply fan operates at a minimum speed, wherein in the running state, the supply fan is modulated between a minimum speed and a maximum speed, and wherein the shutdown state, the supply fan operates at a minimum speed.

Aspect 5. The system of any of aspects 1-4 and 6-8, wherein the supply fan is a variable speed fan.

Aspect 6. The system of any of aspects 1-5 and 7-8, wherein the supply fan operates at a fixed speed.

Aspect 7. The system of any of aspects 1-6 and 8, wherein in (c2), a determination is made as to the operating state of the compressor.

Aspect 8. The system of any of aspects 1-7, wherein in (a), the required capacity is based on a current reading of a dry-bulb temperature of the conditioned space and a predetermined temperature of the conditioned space.

Aspect 9. A method of controlling a heating, ventilating and air conditioning system that includes a compressor, the compressor having the following operational states: a unit off state, a startup state, and a running state, the method comprising
 (a) determining a required capacity of a conditioned space;
 (b) comparing the required capacity determined in (a) with a minimum capacity of the compressor,
  wherein if the required capacity determined in (a) is greater than the minimum capacity of the compressor, then
   (c1) operate the compressor in the running state
  wherein if the required capacity determined (a) is less than the minimum capacity of the compressor,
   (c2) cycle between each of the operational states based on the required capacity determined in (a).

Aspect 10. The method of any of aspects 9 and 11-14, wherein the system further comprises a supply fan, wherein the compressor is a variable speed compressor, and wherein the compressor and the supply fan are controlled simultaneously.

Aspect 11. The method of any of aspects 9-10 and 12-14, wherein the operational state of the compressor further comprises a shutdown state, wherein in the unit off state, the compressor stays off at the off position so that the speed of the compressor is at 0 revolutions per second (rps), wherein in the startup state, the speed of the compressor ramps up at a constant rate from 0 rps until the speed reaches a startup speed of the compressor, wherein in the running state, the compressor is modulated between a minimum speed and a maximum speed, and wherein in the shutdown state, the compressor ramps down from the minimum speed to 0 rps.

Aspect 12. The method of any of aspects 9-11 and 13-14, wherein in the unit off state, the supply fan is off so that the speed of the fan is at 0 rps, wherein in the startup state, the supply fan operates at a minimum speed, wherein in the running state, the supply fan is modulated between a minimum speed and a maximum speed, and wherein the shutdown state, the supply operates at a minimum speed.

Aspect 13. The method of any of aspects 9-12 and 14, wherein in (c2), a determination is made as to the operating state of the compressor.

Aspect 14. The method of any of aspects 9-13, wherein in (a), the required capacity is based on a current reading of a dry bulb temperature of the conditioned space and a predetermined temperature of the conditioned space.

Aspect 15. A method for controlling a compressor and a supply fan in a heating, ventilating and air conditioning system, wherein the compressor and the supply fan are controlled based on an efficiency map and/or a dehumidification map.

Aspect 16. A system, comprising:
  a variable capacity compressor having the following operational states: a unit off state, a startup state, and a running state, and
  a controller that is configured to
  (a) determine a required capacity of a conditioned space;
  (b) compare the required capacity determined in (a) with a minimum capacity of the compressor,
  wherein if the required capacity determined in (a) is greater than the minimum capacity of the compressor, then
    (c1) operate the compressor in the running state; and
  wherein if the required capacity determined (a) is less than the minimum capacity,
    (c2) cycle between each of the operational states based on the required capacity determined in (a).

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A method of controlling a heating, ventilating and air conditioning (HVAC) system that includes a controller and a compressor, the controller operates the compressor in operational states including: a unit off state, a startup state, and a running state, the method comprising:
  determining a required capacity of a conditioned space;
  comparing the required capacity determined with a minimum capacity of the compressor;
  when the required capacity determined is less than the minimum capacity of the compressor, cycling between each of the operational states based on the required capacity determined.

2. The method of claim 1, further comprising:
  when the required capacity determined is greater than the minimum capacity of the compressor, operating the compressor in the running state.

3. The method of claim 1, further comprising:
  calculating a speed of a supply fan based on a compressor speed of the compressor according to a dehumidification map,
  wherein the dehumidification map includes a lookup table.

4. The method of claim 1, further comprising:
  increasing or decreasing a speed of a supply fan with a compressor speed of the compressor based on a dehumidification map.

5. The method of claim 4, wherein the dehumidification map is based on space humidity.

6. The method of claim 1, further comprising:
  calculating a speed of a supply fan based on a compressor speed of the compressor according to an efficiency map,
  wherein the efficiency map includes lookup a table.

7. The method of claim 1, further comprising:
  increasing or decreasing a speed of a supply fan with a compressor speed of the compressor based on an efficiency map.

8. The method of claim 1, further comprising:
  controlling the compressor and a supply fan based on an efficiency map and/or a dehumidification map.

* * * * *